(12) United States Patent
Durairaj et al.

(10) Patent No.: US 9,537,748 B1
(45) Date of Patent: Jan. 3, 2017

(54) FINDING SHORTEST PATH IN MULTI-ACCESS NODES IN CLOUD SERVICE

(75) Inventors: Vinod Durairaj, Kolar Gold Fields (IN); Vasudevu Lakhinana, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 327 days.

(21) Appl. No.: 13/455,044

(22) Filed: Apr. 24, 2012

(51) Int. Cl.
*G06F 15/173* (2006.01)
*H04L 12/751* (2013.01)

(52) U.S. Cl.
CPC ................................. *H04L 45/02* (2013.01)

(58) Field of Classification Search
CPC ..... G06F 15/177; G06F 8/65; G06F 17/30584
USPC .......... 717/171; 370/252, 238; 709/225, 224
See application file for complete search history.

(56) References Cited

U.S. PATENT DOCUMENTS

| | | | | |
|---|---|---|---|---|
| 5,233,604 | A | * | 8/1993 | Ahmadi et al. ............... 370/238 |
| 6,711,152 | B1 | * | 3/2004 | Kalmanek et al. ........... 370/351 |
| 7,120,125 | B2 | * | 10/2006 | Kikuchi et al. ............... 370/252 |
| 7,831,682 | B2 | * | 11/2010 | Certain et al. ................ 709/214 |
| 2004/0006622 | A1 | * | 1/2004 | Burkes et al. ................ 709/225 |
| 2005/0165906 | A1 | * | 7/2005 | Deo et al. ..................... 709/217 |
| 2010/0131640 | A1 | * | 5/2010 | Carter ............... G06F 17/30864 709/224 |
| 2011/0282986 | A1 | * | 11/2011 | Phaal ............................ 709/224 |
| 2011/0321031 | A1 | * | 12/2011 | Dournov et al. ............. 717/171 |

* cited by examiner

*Primary Examiner* — Jeffrey R Swearingen
(74) *Attorney, Agent, or Firm* — Staniford Tomita LLP

(57) ABSTRACT

This disclosure relates to a method, article of manufacture, and apparatus for finding a shortest path in a cloud. In some embodiments, this includes obtaining one or more nodes associated with a tenant, obtaining hop counts for each of the one or more nodes, determining a threshold hop count based on the hop counts, identifying one or more local nodes based on the threshold hop count, and associating the one or more local nodes with the tenant.

17 Claims, 4 Drawing Sheets

FINDING SHORTEST PATH IN MULTI-ACCESS NODES IN CLOUD SERVICE

FIELD

The present invention relates generally to data networks and specifically to systems and methods of finding shortest path to reduce latency in cloud service networks.

BACKGROUND

Cloud computing allows users to perform computing tasks where data, applications and other computing systems resources are accessed over a network. The network of servers and connections used to provide the computing service is generally referred to as the cloud. That is, cloud service providers typically abstract the underlying resources and infrastructures used to deliver the service, so that users can access the resources somewhere in the cloud. Without worrying about the logistics, such as where files are located or how files are stored on dedicated physical storage devices, users can often realize substantial cost savings.

In a cloud system, one service provider may provide files to multiple customers on a global basis. Sharing of computational resources in a cloud system enables a provider to use resources efficiently. Multi-tenant architectures have been developed to allow multiple user groups (also referred to as "organizations" or "tenants") to share the computational resources in cloud computing.

Stronger than simple access control, tenancy is a logical compartmentalization of data and resources within the cloud. Each tenant appears to have unique and sole access to a subset of the system resources. A tenant may be further configured to contain multiple subtenants. Associated with a tenant may be specific access nodes, security control, storage policies, and access to the data stored on that tenant's resources.

During a multi-tenancy configuration, administrators may add certain access nodes as resources available to tenants. Since a tenant is a conceptual subset of the computational resources within a cloud, an administrator may not be aware of the physical location and the logical configuration of an access node. In many instances, a cloud system may comprise distributed computational resources serving customers on a global basis. These computational resources may in turn contain computational resources located across multiple data centers in different locations. Thus, without knowing the underlining network layout of the access nodes available to a tenant, an administrator's configuration may not provide efficient routes to reach resources serving the customers.

There is a need, therefore, for an improved method or system that would find shortest path in multi-access nodes to improve the efficiency and reduce the latency of cloud service networks.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
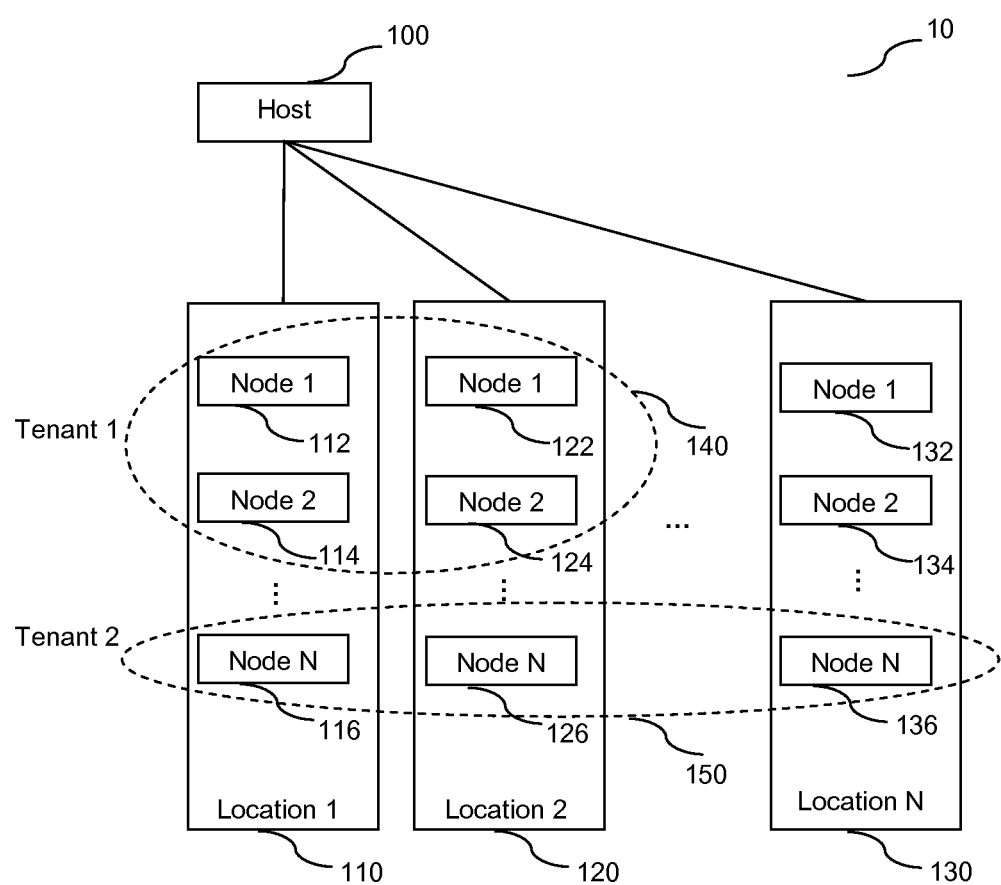
FIG. 1 is a diagram of a system configured to provide multi-tenancy cloud service in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

Disclosed herein are methods and systems to reduce the latency in cloud service networks. In cloud computing, collections of nodes may often be dispersed geographically to achieve the desired system performance, scalability, and availability. Conventional methods may give an administrator the ability to assign these geographically dispersed nodes to a tenant and/or associate them with the tenant. However, locating the most approximate node economically may not be within the realm of the administrator's control.

Network latency may be used to make a relative determination of network efficiency. Examples of parameters that contribute to network latency may include the number and location of hops on a path and the distance between source and destination among others. With fewer hops, there can be less latency in moving data from source to destination within the network.

For example, a round trip message from the data center in New York to the New York Stock Exchange may take 8 milliseconds, from Hopkinton it may take 18 milliseconds, and from London it may take 208 milliseconds. A strategy to reduce the latency may be to locate access nodes that can provide cloud service closer to New York. Closer in distance may also translate to hop reducing, since it reduces the number of WAN links, routers etc. that a message has to go through. If a router takes 400 microsecond for each packet, for example, eliminating the router reduces the latency of the cloud.

In some embodiments of the present invention, a shortest path algorithm may be used to identify access nodes closer in distance to the source. And with less number of hops in between, the present invention reduces the latency and improves the efficiency of cloud service networks, as shown in FIG. 1. FIG. 1 illustrates an exemplary cloud 10 containing Host 100 connecting to nodes at different locations. At each location, a set of nodes may be configured to provide cloud service to a tenant. For example, Node 1 112 and Node 2 114 at Location 1 110 along with Node 1 122 and Node 2 124 at Location 2 120 may be configured to provide cloud service to Tenant 1 140; Node N 116 at Location 1 110 along with Node N 126 at Location 2 120 . . . Node N 136 at Location N 130 may be configured to provide cloud service to Tenant 2 150. From a client perspective, each tenant appears to have unique and sole access to a subset of the cloud. A tenant may be further configured to contain multiple subtenants. Subtenants are logical subsets of tenants that may group together selected policies, data access, and reporting capabilities among others.

In the exemplary cloud 10, according to some conventional methods, even though Host 100 maybe physically closer to Location 1 110 and the resources may be available from Node 1 112 and/or Node 2 114 at Location 1 110, the actual network path reaching the resources may have Node 1 122 at Location 2 120 as the first destination. In the present invention, in accordance with some embodiments, a shortest path algorithm may be deployed to differentiate local nodes such as Node 1 112 and Node 2 114 at Location 1 110. The differentiation may allow Host 100 to only communicate with local nodes to reduce the number of hops as well as the network latency.

Figure 2:
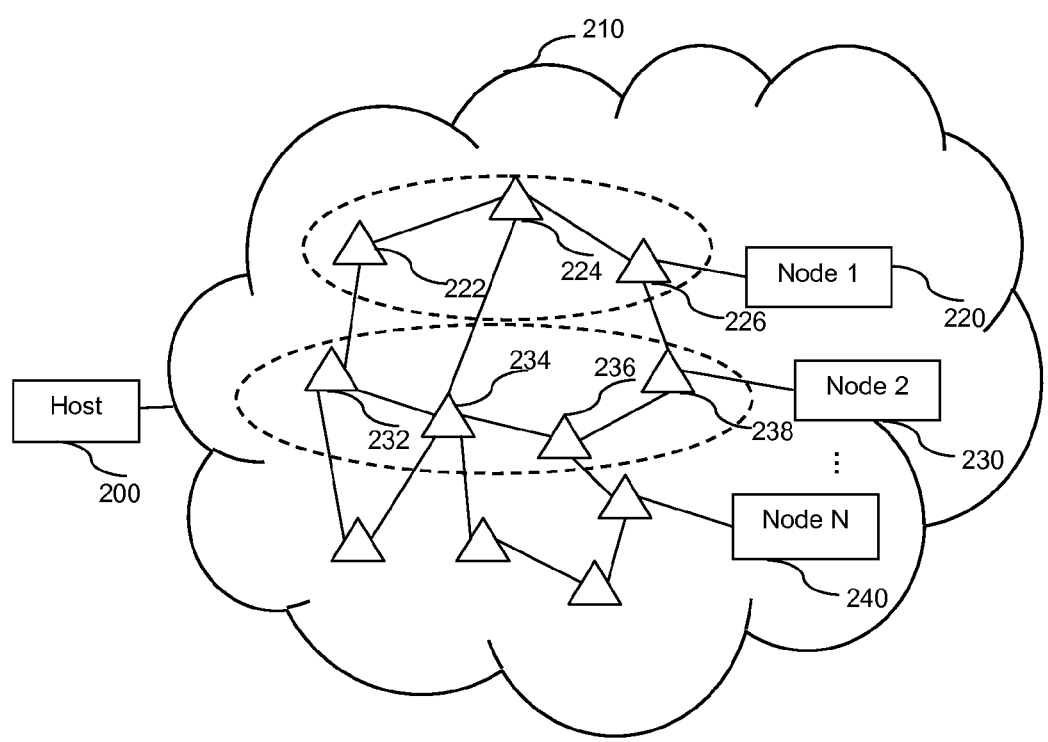
FIG. 2 is a diagram of a cloud service network in accordance with some embodiments.

FIG. 2 is a block diagram of an example cloud illustratively comprising nodes Node 1 220, Node 2 230 . . . Node N 240 and interconnected by links and network devices (e.g., routers) between one or more network domains to provide cloud service to Host 200. In some embodiments, each domain may comprise one or more routers, through which communications, such as data packet traffic, may pass into and out of the cloud. Each cloud may be an enterprise network, a service provider network, or any other network or subnetwork. Furthermore, each cloud may comprise a plurality of different peer connections to one or more other routing domains or clouds. Data packets (e.g., traffic) may be exchanged among the nodes/devices of the computer network using predefined network communication protocols such as the TCP/IP, User Datagram Protocol (UDP), Asynchronous Transfer Mode (ATM) protocol, Frame Relay protocol, Internet Packet Exchange (IPX) protocol, etc.

A shortest path algorithm may be used to calculate the shortest path from Host 200 to the cloud. A node may be a physical server containing a collection of cloud service. Collections of nodes Node 1 220, Node 2 230 . . . Node N 240 may be dispersed geographically to achieve the desired system performance, scalability and availability. The nodes may be further grouped to provide cloud service to one or more tenants.

For example, Node 1 220 and Node 2 230 may be configured as one group to provide cloud service to one tenant, while other nodes in FIG. 2 may be configured to provide cloud service to one or more other tenants. Initially, all nodes in a group assigned to and/or associated with a tenant may be available to provide cloud service to the tenant. Then the shortest path algorithm may be applied to identify a local node group. And only local nodes may participate in providing cloud service to the tenant so that the cloud service network latency may be reduced.

There are several existing data collection utilities that may be used to collect data on the performance of network connection and remote computers. In accordance with one embodiment, to determine whether a node is a local node, traceroute utility may be used to collect information about a network. Other network data collection techniques may also be utilized in various embodiments of the invention.

Traceroute is useful in collecting information about a network through sending UDP packets from the source, followed by exploiting the time-to-live (TTL) field of a packet to determine the route that the packet takes to its destination. In various operating systems, for example, Windows® environment, the implementation of traceroute utility checks the path to the destination, displays the series of routers or computers that are used in delivering packets from source to destination, and how long it took on each hop (a router or a computer). Thus, traceroute may be used to discover the routing and the intermediate links used in the path between a source and a destination.

The discovery of the routing and the intermediate links, in particular the result display of the number of hops may be indicators of the cloud service network latency. With fewer numbers of hops between Host 200 and a node, there may be less latency in moving data from Host 200 to the node. Identifying such nodes, grouping such nodes and using only nodes from the group to provide cloud service to Host 200 may reduce the latency of the cloud service network.

In some embodiments, traceroute command may be issued from Host to each node within a tenant. Analyzing the traceroute result, the number of hops reaching each node may be extracted. A threshold such as the median of the number of hops may be identified. A node may be considered local when the number of hops from Host to the node is less and or equal to the threshold.

For instance, referring back to FIG. 2, in the exemplary cloud 210, assuming initially Node 1 220, Node 2 230 among other nodes are assigned to and/or associated with a tenant as a group of available resources. Utilizing traceroute, the number of hops from Host 200 to each node within the group may be collected, e.g., there are three hops 222, 224, and 226 from Host 200 to Node 1 220, four hops 232, 234, 236, and 238 from Host 200 to Node 2 230. Assuming a threshold such as the median of the number of hops reaching the group is four, Node 1 220 may be considered a local node since three is less than the threshold four hops. Similarly, Node 2 230 may be considered a local node since only four hops are required to reach Node 2 230 from Host 240. Having identified Node 1 220 and Node 2 230 as local nodes, these two nodes as a group may be used to provide cloud service to the tenant. By using local nodes with less number of hops to provide cloud services to a tenant, the present invention finds the shortest path to service requests from Host 200, thus reduces the cloud service network latency.

Figure 3:
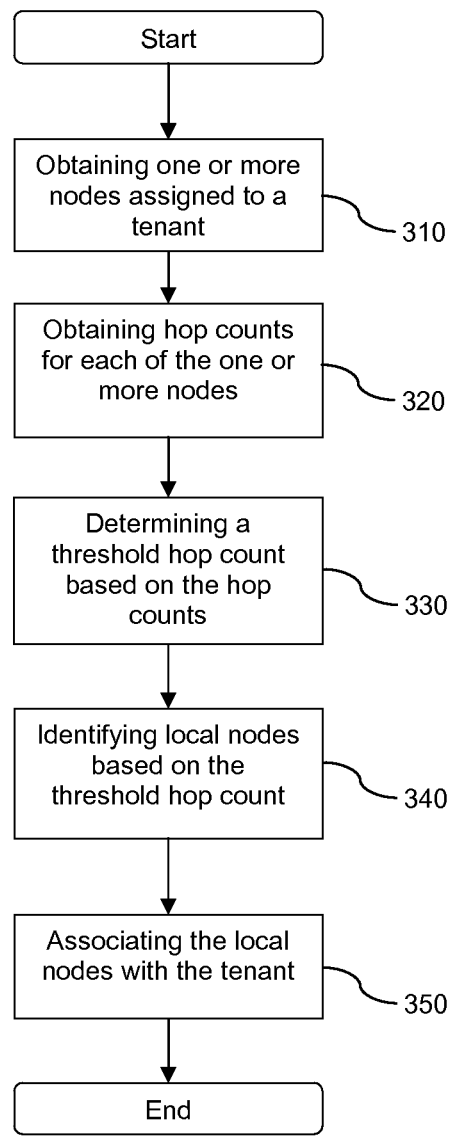
FIG. 3 is a flow chart illustrating a method to find local nodes in accordance with some embodiments.

FIG. 3 is a flowchart illustrating the steps of identifying local nodes. In step 310 one or more nodes assigned to and/or associated with a tenant by an administrator may be obtained. The list of nodes may contain a mixture of local and remote nodes. In step 320, utilities such as traceroute may be used to find the hop counts from Host 200 to each node in the list obtained in step 310. Upon obtaining all the hop counts, in step 330, a threshold such as a median of hop counts may be determined. In step 340, local nodes may be identified based on whether a node has a hop count less than or equal to the threshold of hop counts. If a node has a hop count less than or equal to the threshold of hop counts, the node may be placed in a group of local nodes to participate in providing cloud service to the tenant in step 350.

Figure 4:
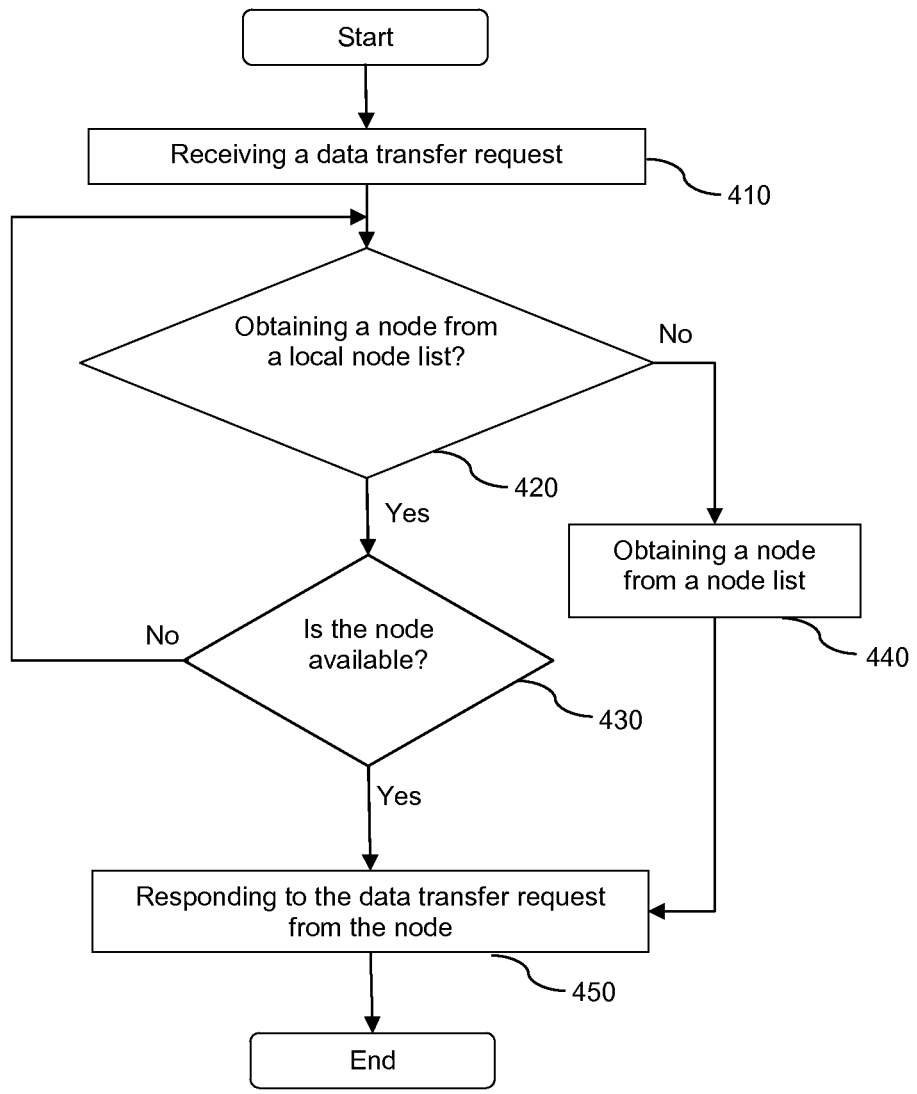
FIG. 4 is a flow chart illustrating a method to find shortest path in multi-access nodes in a cloud in accordance with some embodiments.

FIG. 4 is a flowchart illustrating the steps of locating a node with a cloud when responding to a data transfer request to the cloud. In step 410, the cloud may receive a data transfer request. Upon receiving the request, in step 420, the cloud may attempt to locate a node from a group of available local nodes identified following the steps illustrated in FIG. 3. In accordance with some embodiments, the list of available local nodes may be managed in a round robin scheme, whereby one node is used to serve a request, the next node may be used to serve the next request while the first node is being used, and so forth. Each node may be put back to the list of available local nodes upon finishing a request. Schemes other than round robin may be used. It may not be important for the purpose of the methods and systems described here.

If a local node is obtained successfully from the local node list, in step 430, the node may be tested to see if it is available to provide cloud service. If it is unavailable for any reason, then the next node in the local node list may be selected and tested again. This process loops as long as there is node available in the local node list. If no local node in the local node list is available, e.g. when the local node list is empty, the original list of nodes configured by an administrator may be used to obtain a node in step 440. The obtained node may then respond to the data transfer request in step 450.

Using the methods described above to find the shortest path in multi-access nodes in cloud service has the benefit of reducing network latency and improving network efficiency. The local nodes identified using the shortest path algorithm are shorter in distance and less in number of hops to reach. Further, applying shortest path algorithm would not disturb other cloud service operations such as load balancing, since if no local nodes are available to provide requested cloud service, the original list of nodes may be used to provide the service.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method to reduce latency in cloud services, comprising:
obtaining a plurality of nodes, connected via a network to a host, and associated with a tenant within the cloud, wherein the plurality of nodes comprise physical servers storing data of the tenant, and are configured as a group to provide the cloud services to the tenant, and during an initial period each of the nodes provide the cloud services to the tenant;
after the initial period, issuing from the host over the network a command to each node of the plurality of nodes to obtain a plurality of hop counts, wherein a hop count comprises a number of hops between the host and a node;
associating the plurality of hop counts to the plurality of nodes, each node thereby being associated with a particular hop count of the plurality of hop counts;
comparing the particular hop count associated with each node against a threshold hop count to group a subset of the plurality of nodes into a local node group, each node in the local node group having an associated particular hop count that is less than or equal to the threshold hop count;
testing a node in the local node group to determine if the node is available to provide the cloud services to the tenant;
if the node is available, allowing the node in the local node group to participate in providing the cloud services to the tenant, and excluding nodes outside the local node group from participating in providing the cloud services to the tenant based on each node outside the local node group having an associated particular hop count that is greater than the threshold hop count; and if the node in the local node group is not available and the local node group comprises no other nodes that are available, allowing a node outside the local node group to participate in providing the cloud services to the tenant.

2. The method as recited in claim 1, further comprising receiving a data transfer request to the cloud to obtain the cloud services for the tenant;

obtaining a first node from the local node group when at least one of the one or more local nodes is available to respond to the data transfer request;

responding to the data transfer request from the first node;

obtaining a node from the group associated with the tenant when none of the one or more local nodes is available to respond to the data transfer request; and responding to the data transfer request from the node to provide the cloud services for the tenant.

3. The method as recited in claim 2, wherein obtaining a first node from the local node group includes obtaining a second node from the local node group based on the determination that the first node is not available to respond to the data transfer request.

4. The method as recited in claim 1, wherein obtaining hop counts includes obtaining hop counts through traceroute.

5. The method as recited in claim 1, wherein the threshold hop count is a median of the hop counts.

6. The method of claim 1 wherein the obtaining comprises accessing a listing created by an administrator and comprising the plurality of nodes.

7. The method of claim 1 comprising:
identifying one or more remote nodes based on the threshold hop count;
placing the one or more remote nodes in a remote node group, wherein the local nodes in the local node group are closer to the host than the remote nodes in the remote node group, and
wherein the remote nodes participate in providing the cloud services to the tenant when the local nodes in the local node group are unavailable to provide the cloud services.

8. The method of claim 1 comprising:
before the issuing from the host, allowing the plurality of nodes in the configured group to provide the cloud services to the tenant.

9. The method of claim 1 wherein nodes outside the local node group participate in providing the cloud services to the tenant only when each of the local nodes in the local node group are unavailable to participate in providing the cloud services to the tenant.

10. The method of claim 1 comprising:
selecting an available node to provide the cloud services to the tenant and not selecting another available node to provide the cloud services because the selected available node is in the local node group and the unselected other available node is not in the local node group.

11. The method of claim 1 wherein a plurality of first distances are between the host and the nodes in the local node group, a plurality of second distances are between the host and the nodes outside the local node group, and
wherein the first distances are less than the second distances.

12. A system to reduce latency in cloud services, comprising:

a processor configured to
obtain a plurality of nodes, connected via a network to a host, and associated with a tenant within the cloud, wherein the plurality of nodes comprise physical servers storing data of the tenant and are configured as a group to provide the cloud services to the tenant, and during an initial period each of the nodes provide the cloud services to the tenant,
after the initial period, issue from the host over the network a command to each node of the plurality of nodes to obtain hop counts for each of the one or more nodes within the group,
determine a threshold hop count based on the hop counts,
identify one or more local nodes based on the threshold hop count,
identify one or more remote nodes based on the threshold hop count,
place the one or more local nodes in a local node group to participate in providing the cloud services to the tenant,
place the one or more remote nodes in a remote node group, wherein the local nodes in the local node group are closer to the host than the remote nodes in the remote node group, and
wherein the remote nodes participate in providing the cloud services to the tenant when the local nodes in the local node group are unavailable to provide the cloud services, and wherein the cloud services provided at each node in the local node group are also provided at each other node in the local and remote node groups; and
a memory.

13. The system of claim 12 wherein each of the one or more nodes within the configured group is associated with a single hop count value.

14. The system of claim 12 wherein each of the one or more nodes comprise endpoints.

15. A computer program product to reduce latency in cloud services, comprising a non-transitory computer usable medium having machine readable code embodied therein for:
accessing a listing created by an administrator and comprising a plurality of nodes assigned to a tenant by the administrator, wherein the plurality of nodes are connected via a network to a host and comprise one or more computing devices storing data of the tenant and configured as a group to provide the cloud services to the tenant, and during an initial period each of the nodes provide the cloud services to the tenant;
after the initial period, issuing from the host over the network a command to each node of the plurality of nodes to obtain hop counts for each of the plurality of nodes within the group;
determining a threshold hop count based on the hop counts;
identifying one or more local nodes based on the threshold hop count;
placing the one or more local nodes in a local node group to participate in providing the cloud services to the tenant; and
excluding other nodes outside the local node group from providing the cloud services when there is a local node in the local node group available to provide the cloud services, wherein the local nodes in the local node group are closer to the host of the tenant than the other nodes, and wherein the cloud services provided at each node in the local node group are also provided at each other node in the local and remote node groups.

16. The computer program product of claim 15 wherein each of the one or more nodes within the configured group is associated with a single hop count value.

17. The computer program product of claim 15 wherein each of the one or more nodes comprise endpoints.

* * * * *